United States Patent
Lee et al.

(10) Patent No.: US 9,621,267 B2
(45) Date of Patent: Apr. 11, 2017

(54) VISIBLE LIGHT COMMUNICATION SYSTEM, SYSTEM DATA MODULATION METHOD THEREFOR, AND PERFORMANCE INFORMATION FEEDBACK METHOD

(71) Applicant: INDUSTRY ACADEMY COOPERATION FOUNDATION OF KYUNGHEE UNIVERSITY, Yongin (KR)

(72) Inventors: Kye San Lee, Yongin (KR); Kyujin Lee, Suwon (KR); Dongho Cha, Goyang (KR)

(73) Assignee: INDUSTRY ACADEMY COOPERATION FOUNDATION OF KYUNGHEE UNIVERSITY, Yongin-si (KR)

( * ) Notice: Subject to any disclaimer, the term of this patent is extended or adjusted under 35 U.S.C. 154(b) by 0 days.

(21) Appl. No.: 14/647,145

(22) PCT Filed: Nov. 5, 2013

(86) PCT No.: PCT/KR2013/009930
§ 371 (c)(1),
(2) Date: May 26, 2015

(87) PCT Pub. No.: WO2014/081137
PCT Pub. Date: May 30, 2014

(65) Prior Publication Data
US 2015/0304031 A1 Oct. 22, 2015

(30) Foreign Application Priority Data
Nov. 26, 2012 (KR) ........................ 10-2012-0134809

(51) Int. Cl.
*H04B 10/00* (2013.01)
*H04B 10/116* (2013.01)
*H04B 10/516* (2013.01)

(52) U.S. Cl.
CPC ......... *H04B 10/116* (2013.01); *H04B 10/516* (2013.01)

(58) Field of Classification Search
CPC ........................... H04B 10/116; H04B 10/516
See application file for complete search history.

(56) References Cited

U.S. PATENT DOCUMENTS

2002/0061076 A1* 5/2002 Seki ........................ H04L 1/20
375/316
2002/0167701 A1* 11/2002 Hirata .................. H04B 10/116
398/121

(Continued)

FOREIGN PATENT DOCUMENTS

JP 2010-097988 4/2010
KR 10-2008-0067090 7/2008

(Continued)

*Primary Examiner* — Danny Leung
(74) *Attorney, Agent, or Firm* — Lex IP Meister, PLLC (57) ABSTRACT

A visible light communication system, and a method of modulating data and a method of feeding back performance information in the system, are provided.
In the system, a transmitting unit modulates a plurality of data on a plurality of LED channels basis that are formed by a plurality of LEDs, respectively, and transmits the modulated data into a corresponding light signal. A receiving unit receives a light signal that is transmitted from the transmitting unit to demodulate the received light signal to a signal on a plurality of LED channels basis. By determining performance information on a plurality of LED channels basis by estimating a state on the plurality of LED channels basis, the receiving unit feeds back the performance information to the transmitting unit, and the transmitting unit (Continued)

determines a modulation degree on the channel basis according to performance information on a channel basis of the plurality of LEDs that are fed back from the receiving unit and performs modulation on the plurality of LED channels basis of the plurality of data.

10 Claims, 4 Drawing Sheets

(56)  References Cited

U.S. PATENT DOCUMENTS

| | | | | |
|---|---|---|---|---|
| 2008/0095533 | A1* | 4/2008 | Lee | H04B 10/116 398/38 |
| 2013/0015785 | A1* | 1/2013 | Kamada | H04B 10/116 315/297 |
| 2014/0049573 | A1* | 2/2014 | Ishihara | G09G 3/3413 345/691 |
| 2015/0304031 | A1* | 10/2015 | Lee | H04B 10/516 398/118 |

FOREIGN PATENT DOCUMENTS

| | | |
|---|---|---|
| KR | 10-2011-0089829 | 8/2011 |
| KR | 10-2011-0109993 | 10/2011 |
| KR | 10-2011-0139350 | 12/2011 |

\* cited by examiner

VISIBLE LIGHT COMMUNICATION SYSTEM, SYSTEM DATA MODULATION METHOD THEREFOR, AND PERFORMANCE INFORMATION FEEDBACK METHOD

TECHNICAL FIELD

The present invention relates to a visible light communication system, and a method of modulating data and a method of feeding back performance information in the system.

BACKGROUND ART

Nowadays, development of a visible light communication system that performs visible light communication for various objects is being actively performed. Communication technology using an environmentally-friendly Light Emitting Diode (LED) according to a request of Green IT is being quickly developed.

An LED-identification (ID) system, which is a visible light communication system using an LED element, which is a lighting element, is a wireless communication system that transmits and receives using an LED light source. That is, the LED-ID system is an integrated network system that constructs a wireless communication network using light emitted from the LED and that performs a function of a lighting lamp, and that includes both a wireless communication system and an ID network system.

In order to implement a white LED, which is a basic LED, an LED element for performing a function of a lighting lamp in such an LED-ID system generates light by mixing light of three colors of R, G, and B. Each of three chip LEDs having three color elements has various mixing ratios, and by adjusting a mixing ratio of R, G, and B elements, which are individual color elements, the three chip LEDs may generate light of various colors.

However, in the three chip LEDs having elements of three colors of R, G, and B, an output signal of individual color elements according to a mixing ratio of R, G, and B elements has different transmission power and has different performance due to a difference of transmission power and reception power of individual color signals in a transceiver. Particularly, due to color signal power of a low output in a transmitting terminal, there is a problem that performance of an entire system is rapidly deteriorated.

The above information disclosed in this Background section is only for enhancement of understanding of the background of the invention and therefore it may contain information that does not form the prior art that is already known in this country to a person of ordinary skill in the art.

DISCLOSURE

Technical Problem

The present invention has been made in an effort to provide a visible light communication system, and a method of modulating data and a method of feeding back performance information in the system, having advantages of being capable of preventing performance of an entire system from being deteriorated due to color signal power of a low output.

Technical Solution

An exemplary embodiment of the present invention provides a visible light communication system that performs visible light communication using a plurality of Light Emitting Diodes (LEDs), including:
a modulation controller that determines a modulation degree on a channel basis of the plurality of LEDs; and a modulation unit that modulates data to transmit on a channel basis, and outputs the data to a receiving unit according to a modulation degree on a channel basis of the plurality of LEDs that are determined by the modulation controller, wherein the modulation controller determines a modulation degree on a channel basis according to performance information on a channel basis of the plurality of LEDs that are fed back from the receiving unit.

The visible light communication system may further include: a mixing ratio determining unit that determines a mixing ratio of the plurality of LEDs; a transmission power application unit that allocates and applies transmission power on the channel basis according to a mixing ratio that is determined by the mixing ratio determining unit; and an LED unit that transmits a signal on the plurality of LED channels basis to which transmission power is applied in the transmission power application unit through a visible light wireless channel.

Information of the modulation degree on a channel basis may be given to a pilot signal, a preamble signal, and a postamble signal and be transmitted to the receiving unit.

The modulation controller may determine a lower modulation degree than a previous modulation degree of a channel in which performance on a channel basis becomes lower than a normal performance range with reference to performance information on a channel basis of the plurality of LEDs that is fed back from the receiving unit.

The modulation controller may determine a higher modulation degree than a previous modulation degree of a channel in which performance on a channel basis becomes higher than a normal performance range with reference to performance information on a channel basis of the plurality of LEDs that is fed back from the receiving unit.

The modulation controller may determine to maintain a previous modulation degree of a channel in which performance on a channel basis exists within a normal performance range with reference to performance information on a channel basis of the plurality of LEDs that is fed back from the receiving unit.

The modulation controller may set an initial modulation degree on a channel basis of the plurality of LEDs in an initial operation of the visible light communication system, and the modulation unit may modulate data according to the initial modulation degree.

The modulation controller may include: a performance change determining unit that receives performance information on a channel basis that is fed back from the receiving unit to determine a performance change on a channel basis; a modulation degree storage unit that stores a modulation degree on the channel basis; and a modulation degree determining unit that determines a modulation degree on the channel basis to apply upon modulating data in the modulation unit with reference to a modulation degree on the channel basis that is stored at the modulation degree storage unit according to a performance change on the channel basis that is determined in the performance change determining unit.

Another embodiment of the present invention provides a visible light communication system that performs visible light communication using a plurality of Light Emitting Diodes (LEDs), including:
a light source receiving unit that receives a signal through a plurality of LED channels; a power measuring unit that measures reception power on the plurality of LED channels basis using a pilot signal and a preamble signal or a postamble signal that are received through the light source receiving unit; and a performance information feedback unit that grasps a state on each channel basis based on reception power on the channel basis that is measured in the power measuring unit and that generates performance information including performance on a channel basis that is determined based on the grasped state on a channel basis to feed back the performance information to a transmitting unit, wherein the performance information includes information about whether performance on the channel basis becomes lower than a performance range that is previously set on the channel basis, whether performance on the channel basis becomes higher than a performance range that is previously set on the channel basis, or whether a performance change does not exist by belonging within the performance range.

The visible light communication system may further include: a demodulation controller that extracts information of a modulation degree on a channel basis through a pilot signal and a preamble signal or a postamble signal that are transmitted from the transmitting unit; and a demodulation unit that demodulates a signal on a channel basis according to a modulation degree on a channel basis that is extracted by the demodulation controller.

The performance information feedback unit may include: a channel performance grasping unit that estimates a state on the channel basis based on power information on a channel basis that is measured in the power measuring unit to grasp performance on a channel basis; a performance range storage unit that stores a performance range that is previously set on the channel basis; and a performance information generator that generates performance information by comparing performance on a channel basis that is grasped in the channel performance grasping unit and a performance range on a channel basis that is stored at the performance range storage unit to feed back the performance information to the transmitting unit.

Yet another embodiment of the present invention provides a visible light communication system that performs visible light communication using a plurality of Light Emitting Diodes (LEDs), including:

a transmitting unit that modulates each of a plurality of data on a plurality of LED channels basis that are formed by a plurality of LEDs and that transmits the plurality of data in a corresponding light signal; and a receiving unit that receives a light signal that is transmitted from the transmitting unit to demodulate the light signal into a signal on a plurality of LED channels basis, wherein the receiving unit estimates a state on the plurality of LED channels basis, determines performance information on the plurality of LED channels basis, and feeds back the performance information to the transmitting unit, and the transmitting unit determines a modulation degree on the channel basis according to performance information on a channel basis of the plurality of LEDs that are fed back from the receiving unit and performs modulation on the plurality of LED channels basis of the plurality of data.

The transmitting unit may include: a modulation controller that determines a modulation degree on the channel basis according to performance information on a channel basis of the plurality of LEDs that are fed back from the receiving unit; and a modulation unit that modulates data to transmit on a channel basis according to a modulation degree on a channel basis of the plurality of LEDs that are determined by the modulation controller and that transmits the data to the receiving unit.

The receiving unit may include: a light source receiving unit that receives a signal through the plurality of LED channels; a power measuring unit that measures reception power on the plurality of LED channels basis using a pilot signal and a preamble signal or a postamble signal that are received through the light source receiving unit; and a performance information feedback unit that grasps a state on each channel basis based on reception power on the channel basis that is measured in the power measuring unit and that generates performance information including performance on a channel basis that is determined based on the grasped state on a channel basis and that feeds back the performance information to the transmitting unit.

The performance information on the channel basis may include information about whether performance on the channel basis becomes lower than a performance range that is previously set on the channel basis, whether performance on the channel basis becomes higher than a performance range that is previously set on the channel basis, or whether a performance change does not exist by belonging within the performance range.

The modulation controller may determine a lower modulation degree than a previous modulation degree of a channel that is represented as the performance information is lowered, and may determine a higher modulation degree than a previous modulation degree of a channel that is represented as the performance information is enhanced.

Yet another embodiment of the present invention provides a method in which a visible light communication system that performs visible light communication using a plurality of Light Emitting Diodes (LEDs) modulates data, including:

determining a modulation degree on the channel basis according to performance information on a channel basis of the plurality of LEDs that is fed back from a receiving unit; and performing modulation on a channel basis of each of a plurality of data to transmit by applying the determined modulation degree on the channel basis.

The determining of a modulation degree on the channel basis includes: determining a lower modulation degree than a previous modulation degree of a channel in which performance on a channel basis that is determined by the performance information becomes lower than a performance range that is previously set on the channel basis; determining a higher modulation degree than a previous modulation degree of a channel in which performance on a channel basis that is determined by the performance information becomes higher than the performance range; and determining to maintain a previous modulation degree of a channel in which performance on a channel basis that is determined by the performance information exists within the performance range.

The determining of a modulation degree on the channel basis may include determining a modulation degree on the channel basis to be a preset initial modulation degree in an initial operation of the visible light communication system.

Yet another embodiment of the present invention provides a method in which a visible light communication system that performs visible light communication using a plurality of Light Emitting Diodes (LEDs) feeds back performance information, including:

measuring reception power on a channel basis of a signal that is received through a channel of the plurality of LEDs; grasping performance on the channel basis based on reception power on the channel basis and generating performance information on the channel basis based on the grasped performance on the channel basis; and feeding back the generated performance information on the channel basis to a transmitting unit, wherein the performance information on the channel basis includes information about whether performance on the channel basis becomes lower than a performance range that is previously set on the channel basis, whether performance on the channel basis becomes higher than a performance range that is previously set on the channel basis, or whether a performance change does not exist by belonging within the performance range.

The generating of performance information on the channel basis may include: estimating a state on the channel basis based on the measured reception power on the channel basis to grasp performance on a channel basis; and comparing the grasped performance on a channel basis and a performance range on the channel basis and generating performance information on the channel basis.

The method may further include: after the feeding back of the generated performance information, extracting information of a modulation degree on a channel basis through a pilot signal and a preamble signal or a postamble signal that are transmitted from the transmitting unit; and demodulating each signal on a channel basis according to the extracted modulation degree on a channel basis and restoring original data.

Advantageous Effects

According to the present invention, a problem of having different performances due to a difference of transmission power and reception power of individual color signals can be solved.

Therefore, performance of an entire system due to color signal power of a low output can be prevented from being deteriorated.

Thereby, service quality of an entire system can be improved.

MODE FOR INVENTION

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In addition, in the entire specification, unless explicitly described to the contrary, the word "comprise" and variations such as "comprises" or "comprising" will be understood to imply the inclusion of stated elements but not the exclusion of any other elements. In addition, the terms "-er", "-or", and "module" described in the specification mean units for processing at least one function and operation, and can be implemented by hardware components or software components and combinations thereof.

Figure 1:
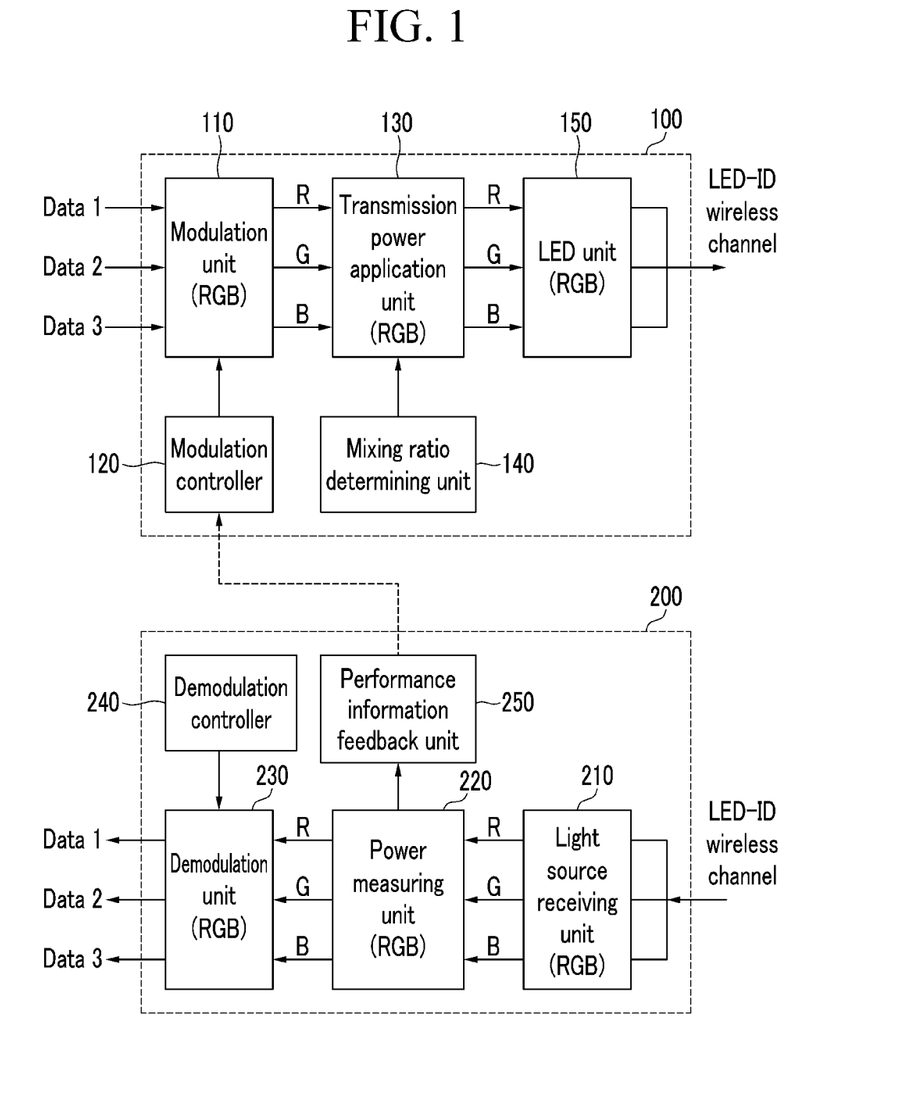
FIG. 1 is a block diagram illustrating a configuration of an LED-ID system according to an exemplary embodiment of the present invention.

FIG. 1 is a block diagram illustrating a configuration of an LED-ID system according to an exemplary embodiment of the present invention.

As shown in FIG. 1, an LED-ID system according to an exemplary embodiment of the present invention includes a transmitting unit 100 and a receiving unit 200. Here, only a configuration in which the transmitting unit 100 of the LED-ID system transmits multimedia information to the outside, i.e., to the receiving unit 200, through LEDs of three colors of RGB in the LED-ID system is described, and description of a general configuration, for example, a configuration that performs a function of a reader and a tag and operation of the LED-ID system in which the receiving unit 200 receives an LED signal of three colors of R, G, and B from the transmitting unit 100 to demodulate data, is omitted.

The transmitting unit 100 includes a modulation unit 110, a mixing ratio determining unit 120, a transmission power application unit 130, an LED unit 140, and a modulation controller 150.

Because the modulation unit 110 uses a plurality of data to transmit an RGB LED signal in an exemplary embodiment of the present invention, the modulation unit 110 loads three kinds of data (data1, data2, and data3) in a carrying frequency of a specific frequency band and modulates the data to a transmitting signal. An on-off keying modulation technique may be applied to such modulation. In this case, the modulation unit 110 performs modulation of each of RGB colors according to a modulation degree that is determined in the modulation controller 150. Operation of such a modulation controller 150 will be described later.

The mixing ratio determining unit 120 determines a mixing ratio of individual RGB color elements according to a color to be implemented. Such a mixing ratio is already set in several forms according to a color to be implemented, and when a form thereof is determined by a manager or an operator, the mixing ratio may be determined to a mixing ratio of a corresponding form. For example, as in Table 1, when a white LED is formed, an RGB mixing ratio of four forms (Types 1, 2, 3, and 4) may be used, and when one of the four forms is selected, the mixing ratio is determined to an RGB mixing ratio corresponding thereto. In Table 1, for example, when Type 2 is selected, a mixing ratio of RGB is determined to be 1:1.43:2.29.

TABLE 1

|  | Red | Green | Blue |
| --- | --- | --- | --- |
| Type 1 | 1 | 0.89 | 2.51 |
| Type 2 | 1 | 1.43 | 2.29 |
| Type 3 | 1 | 2.62 | 1.96 |
| Type 4 | 1 | 11.17 | 7.19 |

The transmission power application unit 130 calculates transmission power to be applied to signals that are allocated to each channel of RGB colors according to a mixing ratio that is determined by the mixing ratio determining unit 120, and applies transmission power that is calculated to each signal to output the transmission power to the LED unit 140. Here, when it is assumed that entire power to be applied to each signal is fixed, calculation of transmission power to be applied to signals that are allocated to each channel of RGB according to a mixing ratio will be easily understood by a person of ordinary skill in the art, and thus a detailed description thereof will be omitted.

The LED unit 140 transmits an allocation signal on an RGB channel basis to which transmission power is applied in the transmission power application unit 130 to the receiving unit 200 through an LED-ID wireless channel.

The modulation controller 150 receives performance information, i.e., performance information on an RGB channel basis of a receiving channel that is fed back from the receiving unit 200 to determine a modulation degree to be applied to a corresponding receiving channel, i.e., on an RGB channel basis, and transfers the modulation degree to the modulation unit 110. Therefore, the modulation unit 110 may perform modulation of each of RGB channels according to a modulation degree that is transferred from the modulation controller 150.

Basically, in an initial operation of an LED-ID system according to an exemplary embodiment of the present invention, it is assumed that performance of an RGB channel is normal, and the modulation controller 150 transfers the same modulation degree or a modulation degree that is previously set on an RGB channel basis to the modulation unit 110 for an RGB channel. In the present exemplary embodiment, it is assumed that entire power that is applied to an entire RGB channel is fixed, and as in the example, because transmission power to be applied to signals that are allocated to each channel of RGB colors is different according to a mixing ratio, it is assumed that modulation degrees that are applied to each data to be transmitted through the RGB channel according to the allocated transmission power may be each set on an RGB channel basis.

Here, performance information on an RGB channel basis that is fed back from the receiving unit 200 represents a performance change on an RGB channel basis. For example, performance information on an RGB channel basis represents information that performance becomes lower than a preset performance range on an RGB channel basis, information that performance becomes higher than a preset performance range on an RGB channel basis, or information of no change. In this way, the receiving unit 200 determines a change of a performance range that is set on an RGB channel basis. Such a performance range that is set on an RGB channel basis is set by throughput performance according to transmitting and receiving performance of individual RGB elements, and such a throughput performance may use an already prescribed material on individual RGB elements basis or may be set through experiments.

Therefore, the modulation controller 150 determines a modulation degree to apply a lower modulation degree than a previously determined modulation degree of a channel in which a performance is lowered by performance information on an RGB channel basis that is fed back from the receiving unit 200, and determines a modulation degree to apply a higher modulation degree of a channel in which performance is enhanced. However, the modulation controller 150 maintains a previous modulation degree of a channel in which a performance change does not exist. Here, a modulation degree may be changed to be low or to be high by changing a level of a determined modulation degree one by one or by one or more.

The transmitting unit 100 gives information of a modulation degree that is determined in the modulation controller 150 and mixing ratio information that is determined in the mixing ratio determining unit 120 to a pilot signal and a preamble signal or a postamble signal, and transmits the information and the mixing ratio information to the receiving unit 200.

The receiving unit 200 includes a light source receiving unit 210, a power measuring unit 220, a demodulation unit 230, a demodulation controller 240, and a performance information feedback unit 250.

The light source receiving unit 210 receives each of allocation signals on an RGB channel basis that are transmitted from the transmitting unit 100 through an LED-ID wireless channel using a photodetector.

The power measuring unit 220 measures a channel state and reception power of a light signal using a pilot signal and a preamble signal or a postamble signal that are received through the light source receiving unit 210.

The demodulation unit 230 performs demodulation of signals on a channel basis that are output through the power measuring unit 220 and outputs demodulated data. In such demodulation, an on-off keying demodulation technique may be applied. In this case, the demodulation unit 230 performs demodulation of each of RGB signals according to a modulation degree that is transferred from the demodulation controller 240.

The demodulation controller 240 extracts information of a modulation degree through a pilot signal and a preamble signal or a postamble signal that are transmitted from the transmitting unit 100 to determine a modulation degree on an RGB channel basis, and transfers the modulation degree to the demodulation unit 230.

Therefore, in order to demodulate a signal on an RGB channel basis, the demodulation unit 230 applies a modulation degree on an RGB channel basis that is transferred from the demodulation controller 240.

The performance information feedback unit 250 grasps a state of each channel based on reception power information on an RGB channel basis that is measured in the power measuring unit 220, and grasps performance of the grasped state on a channel basis. That is, the performance information feedback unit 250 sets a performance range on an RGB channel basis by throughput performance according to transmitting and receiving performance of individual RGB elements, compares receiving performance on an RGB channel basis that is grasped based on reception power information on an RGB channel basis that is measured in the power measuring unit 220 and a preset performance range, and determines a change of receiving performance. In a channel in which receiving performance is lower than a preset performance range, it is determined that performance of a corresponding channel is lowered, and in a channel in which receiving performance is higher than a preset performance range, it is determined that performance of a corresponding channel is enhanced. However, in a channel in which receiving performance is included within a preset performance range, it is determined that a performance change of a corresponding channel does not exist.

Therefore, the performance information feedback unit 250 feeds back information of performance information, i.e., performance change (low, high, or no change) on an RGB channel basis that is determined on an RGB channel basis to the transmitting unit 100.

Figure 2:
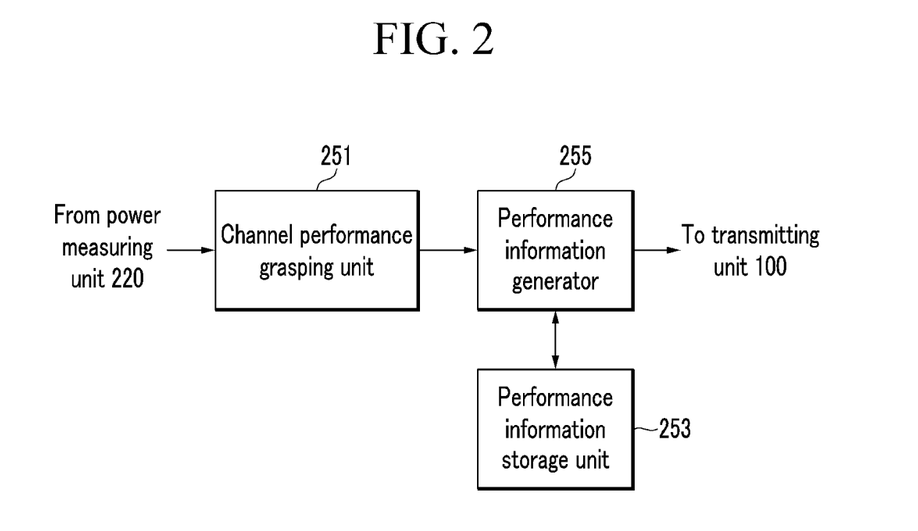
FIG. 2 is a block diagram illustrating a detailed configuration of a performance information feedback unit of FIG. 1.

FIG. 2 is a block diagram illustrating a detailed configuration of the performance information feedback unit 250 of FIG. 1.

As shown in FIG. 2, the performance information feedback unit 250 includes a channel performance grasping unit 251, a performance range storage unit 253, and a performance information generator 255.

The channel performance grasping unit 251 estimates a state of each channel of RGB colors based on power information on an RGB channel basis that is measured in the power measuring unit 220 to grasp performance on a channel basis. Such a method of grasping performance is already well known and thus a detailed description thereof will be omitted. For example, performance of a channel is grasped by transmission power of a light source and reception power of a light receiver, and may be a Bit Error Rate (BER), a Signal-to-Noise Ratio (SNR), a Signal-to-Interference-plus-Noise Ratio (SINR), a Carrier-to-Noise Ratio (CNR), and a Carrier-to-Interference-plus-Noise Ratio (CINR).

The performance range storage unit 253 stores a value of a normal performance range on an RGB channel basis. A value of such a performance range should correspond with performance that is grasped in the channel performance grasping unit 251, and may be, for example, a value of a BER, an SNR, an SINR, a CNR, and a CINR. Here, it is typical that a performance range has a lower limit value and an upper limit value or for a performance range to be determined as one value.

The performance information generator 255 compares performance on an RGB channel basis that is grasped in the channel performance grasping unit 251 and a performance range on an RGB channel basis that is stored at the performance range storage unit 253, and determines whether performance on an RGB channel basis that is grasped in the channel performance grasping unit 251 becomes lower than a normal performance range, whether performance on an RGB channel basis that is grasped in the channel performance grasping unit 251 becomes higher than a normal performance range, or whether performance on an RGB channel basis that is grasped in the channel performance grasping unit 251 exists within a normal performance range, generates performance information as a determined result, and transmits the performance information to the transmitting unit 100. For example, when performance of an R channel becomes lower than a normal performance range, it represents information that performance of the R channel is lowered, and when performance of a B channel exists within a normal performance range, it represents information that a performance change of the B channel does not exist.

Figure 3:
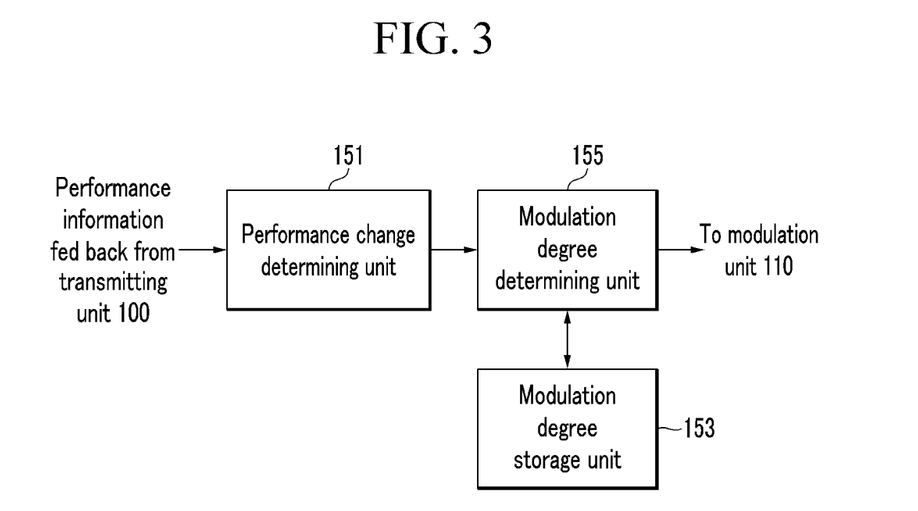
FIG. 3 is a block diagram illustrating a detailed configuration of a modulation controller of FIG. 1.

FIG. 3 is a block diagram illustrating a detailed configuration of the modulation controller 150 of FIG. 1.

As shown in FIG. 3, the modulation controller 150 includes a performance change determining unit 151, a modulation degree storage unit 153, and a modulation degree determining unit 155.

The performance change determining unit 151 receives performance information on an RGB channel basis that is fed back from the receiving unit 200, and determines a performance change on an RGB channel basis. That is, the performance change determining unit 151 determines that a performance change becomes lower than or higher than a normal performance range on an RGB channel basis, or does not exist in a normal performance range on an RGB channel basis.

The modulation degree storage unit 153 stores information of a modulation degree on an RGB channel basis that applies when the modulation unit 110 performs modulation of latest data.

The modulation degree determining unit 155 determines a modulation degree on an RGB channel basis to apply upon modulating data in the modulation unit 110 with reference to a modulation degree on an RGB channel basis that is stored at the modulation degree storage unit 153 according to a performance change on an RGB channel basis that is determined in the performance change determining unit 151.

When it is determined that performance of a specific channel of RGB channels is lowered in the performance change determining unit 151, the modulation degree determining unit 155 determines a lower modulation degree than a modulation degree that is stored at the modulation degree storage unit 153 of a corresponding channel as a modulation degree to apply upon next modulation for a corresponding channel. However, when the performance change determining unit 151 determines that performance of a specific channel of RGB channels is enhanced, the modulation degree determining unit 155 determines a higher modulation degree than a modulation degree that is stored at the modulation degree storage unit 153 to a modulation degree to apply upon next modulation of a corresponding channel. Further, when the performance change determining unit 151 determines that a performance change of a specific channel of RGB channels does not exist, the modulation degree determining unit 155 determines a modulation degree that is stored at the modulation degree storage unit 153 to a modulation degree to apply upon next modulation of a corresponding channel. That is, a modulation degree is not changed. Here, in determining a modulation degree, when determining a low modulation degree or a high modulation degree, a modulation degree in which one level is low or high may be selected on a level of a preset modulation degree, or a low modulation degree or a high modulation degree having a difference in two or more level gaps may be determined. Such a level gap difference may be set according to a magnitude in which a performance on a channel basis deviates from a normal performance range. That is, as a magnitude of deviation from a performance range increases, a level gap difference may be determined as a large modulation degree.

The modulation degree determining unit 155 transfers a modulation degree on an RGB channel basis that is determined with the above method to the modulation unit 110 while storing it as a new modulation degree.

Therefore, the modulation unit 110 may perform modulation of data according to a modulation degree on an RGB channel basis that is determined by the modulation degree determining unit 155, and in this way, as the transmitting unit 100 performs modulation of data by reflecting a change of receiving performance on an RGB channel basis that is received in the receiving unit 200, even if receiving performance is worsened, by compensating transmission power by applying a lower modulation degree to a corresponding channel, service quality of a system can be satisfied.

Hereinafter, a method of modulating data and a method of feeding back performance information according to an exemplary embodiment of the present invention will be described. Here, a method of modulating data is performed in the transmitting unit 100 of an LED-ID system, and a method of feeding back performance information is performed in the receiving unit 200.

First, a method of modulating data in an LED-ID system according to an exemplary embodiment of the present invention will be described. Here, a method of modulating data is described from a modulation viewpoint for compensating system performance rather than from a data transmission viewpoint.

Figure 4:
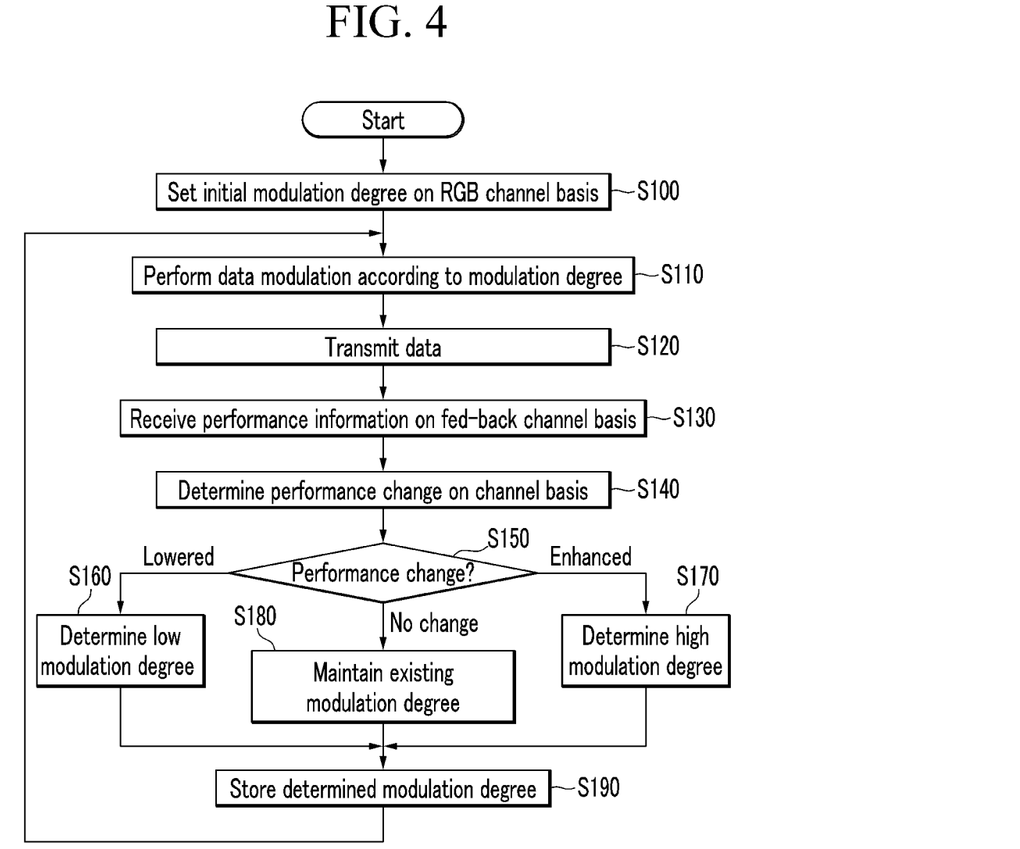
FIG. 4 is a flowchart illustrating a method of modulating data according to an exemplary embodiment of the present invention.

FIG. 4 is a flowchart illustrating a method of modulating data according to an exemplary embodiment of the present invention.

Referring to FIG. 4, the modulation degree determining unit 155 of the transmitting unit 100 previously sets an initial modulation degree on an RGB channel basis, stores the initial modulation degree at the modulation degree storage unit 153 in an initial operation of an LED-ID system, and transfers such an initial modulation degree to the modulation unit 110 (S100).

Therefore, the modulation unit 110 modulates each data on an RGB channel basis according to an initial modulation degree that is transferred from the modulation degree determining unit 155 (S110), the transmission power application unit 130 calculates transmission power to be applied to signals that are allocated to each channel of RGB colors according to a mixing ratio that is determined by the mixing ratio determining unit 120, and applies the calculated transmission power to each signal, and the LED unit 140 transmits signals to which transmission power is applied to the receiving unit 200 through the RGB channel (S120).

Thereafter, the modulation controller 150 of the transmitting unit 100 receives performance information on an RGB channel basis that is fed back from the receiving unit 200 (S130), and the performance change determining unit 151 of the modulation controller 150 determines a performance change on an RGB channel basis based on performance information on an RGB channel basis (S140).

The modulation controller 150 determines whether a performance change on an RGB channel basis that is determined in the performance change determining unit 151 is lowered (S150), and if a performance change on an RGB channel basis that is determined in the performance change determining unit 151 is lowered, the modulation degree determining unit 155 determines a lower modulation degree than an initial modulation degree of a channel that is determined as performance is lowered (S160).

If a performance change on an RGB channel basis that is determined in the performance change determining unit 151 is enhanced, the modulation degree determining unit 155 determines a higher modulation degree than an initial modulation degree of a channel in which performance is enhanced (S170).

If a performance change on an RGB channel basis that is determined in the performance change determining unit 151 does not exist, the modulation degree determining unit 155 determines to maintain an initial modulation degree of a channel in which a performance change does not exist (S180).

Thereafter, the modulation degree determining unit 155 stores a modulation degree that is determined at steps S160, S170, and S180 at the modulation degree storage unit 153 (S190).

The modulation degree determining unit 155 transfers the determined modulation degree to the modulation unit 110, and the modulation unit 110 performs data modulation according to a determined modulation degree (S110).

Hereinafter, a method of feeding back performance information in an LED-ID system according to an exemplary embodiment of the present invention will be described.

Figure 5:
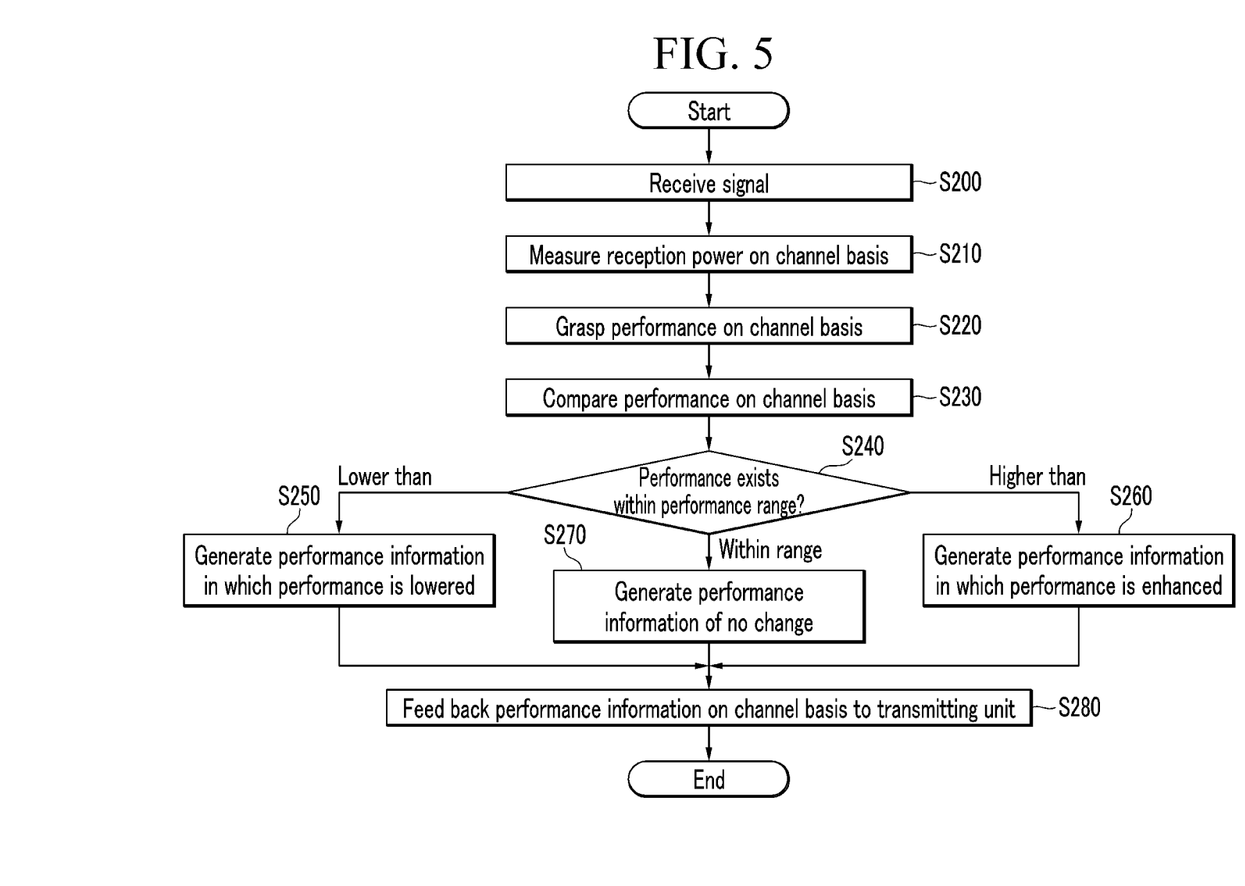
FIG. 5 is a flowchart illustrating a method of feeding back performance information according to an exemplary embodiment of the present invention.

FIG. 5 is a flowchart illustrating a method of feeding back performance information according to an exemplary embodiment of the present invention.

Referring to FIG. 5, the light source receiving unit 210 of the receiving unit 200 receives each of allocation signals on an RGB channel basis that are transmitted from the transmitting unit 100 through an LED-ID wireless channel using a photodetector (S200).

Thereafter, the power measuring unit 220 measures a channel state and reception power of a light signal using a pilot signal and a preamble signal or a postamble signal that are received through the light source receiving unit 210 (S210).

The channel performance grasping unit 251 then estimates a state of each channel of RGB colors based on power information on an RGB channel basis that is measured in the power measuring unit 220, and grasps a performance on a channel basis (S220).

Subsequently, the performance information generator 255 compares performance on an RGB channel basis that is grasped in the channel performance grasping unit 251 and a performance range on an RGB channel basis that is stored at the performance range storage unit 253 (S230), and as a comparison result (S240), if performance of a channel that is grasped in the channel performance grasping unit 251 is lower than a performance range of a corresponding channel, the performance information generator 255 generates performance information in which performance of a corresponding channel is lowered (S250).

If performance of a channel that is grasped in the channel performance grasping unit 251 is higher than a performance range of a corresponding channel, the performance information generator 255 generates performance information in which performance of a corresponding channel is enhanced, i.e., performance information in which performance is enhanced (S260).

Further, if performance of a channel that is grasped in the channel performance grasping unit 251 exists within a performance range of a corresponding channel, the performance information generator 255 generates performance information in which a performance change of the corresponding channel does not exist (S270).

Thereafter, the performance information generator 255 feeds back performance information on an RGB channel basis that is generated at steps S240, S250, and S260 to the transmitting unit 100 (S280).

In the following description, it is determined that performance of a channel that is grasped through a receiving channel is lowered, enhanced, or has no change based on a normal performance range, but the present invention is not limited thereto and may grasp and use only that performance is lowered based on one reference, i.e., one threshold value, or may grasp and use only that performance is enhanced based on one threshold value. Such a configuration may be easily understood by a person of ordinary skill in the art with reference to the above description.

Further, in the foregoing description, it is described that the receiving unit 200 grasps performance on a channel basis and transfers performance information to the transmitting unit 100, but the present invention is not limited thereto, and a person of ordinary skill in the art may be easily understood through the description that the receiving unit 200 may measure only state information on a channel basis and feed back the state information to the transmitting unit 100 and that the transmitting unit 100 may grasp performance on a channel basis from state information on a channel basis that is fed back from the receiving unit 200 to determine performance information.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A visible light communication system that performs visible light communication using a plurality of Light Emitting Diodes (LEDs), the visible light communication system comprising:
    a modulation controller that determines a modulation degree on a channel basis of the plurality of LEDs; and
    a modulation unit that modulates data to transmit on a channel basis, and outputs the data to a receiving unit according to a modulation degree on a channel basis of the plurality of LEDs that are determined by the modulation controller,
    wherein the modulation controller determines the modulation degree on a channel basis according to performance information on a channel basis of the plurality of LEDs that are fed back from the receiving unit, and
    the modulation controller determines a lower modulation degree than a previous modulation degree of a channel in which performance on a channel basis becomes lower than a normal performance range with reference to performance information on a channel basis of the plurality of LEDs that is fed back from the receiving unit.

2. The visible light communication system of claim 1, further comprising:
    a mixing ratio determining unit that determines a mixing ratio of the plurality of LEDs;
    a transmission power application unit that allocates and applies transmission power on the channel basis according to a mixing ratio that is determined by the mixing ratio determining unit; and
    an LED unit that transmits a signal on the plurality of LED channels basis to which transmission power is applied in the transmission power application unit through a visible light wireless channel.

3. The visible light communication system of claim 1, wherein information of the modulation degree on a channel basis is given to a pilot signal, a preamble signal, and a postamble signal and is transmitted to the receiving unit.

4. The visible light communication system of claim 1, wherein the modulation controller determines a higher modulation degree than a previous modulation degree of a channel in which performance on a channel basis becomes higher than a normal performance range with reference to performance information on a channel basis of the plurality of LEDs that is fed back from the receiving unit.

5. The visible light communication system of claim 1, wherein the modulation controller determines to maintain a previous modulation degree of a channel in which performance on a channel basis exists within a normal performance range with reference to performance information on a channel basis of the plurality of LEDs that is fed back from the receiving unit.

6. The visible light communication system of claim 1, wherein the modulation controller sets an initial modulation degree on a channel basis of the plurality of LEDs in an initial operation of the visible light communication system, and the modulation unit modulates data according to the initial modulation degree.

7. The visible light communication system of claim 1, wherein the modulation controller comprises:
    a performance change determining unit that receives performance information on a channel basis that is fed back from the receiving unit to determine a performance change on a channel basis;
    a modulation degree storage unit that stores a modulation degree on the channel basis; and
    a modulation degree determining unit that determines a modulation degree on the channel basis to apply upon modulating data in the modulation unit with reference to a modulation degree on the channel basis that is stored at the modulation degree storage unit according to a performance change on the channel basis that is determined in the performance change determining unit.

8. A method in which a visible light communication system that performs visible light communication using a plurality of Light Emitting Diodes (LEDs) modulates data, the method comprising:
    determining a modulation degree on the channel basis according to performance information on a channel basis of the plurality of LEDs that is fed back from a receiving unit; and
    performing modulation on a channel basis of each of a plurality of data to transmit by applying the determined modulation degree on the channel basis,
    wherein the determining of a modulation degree on the channel basis comprises determining a lower modulation degree than a previous modulation degree of a channel in which performance on a channel basis that is determined by the performance information becomes lower than a performance range that is previously set on the channel basis.

9. The method of claim 8, wherein the determining of a modulation degree on the channel basis comprises:
    determining a higher modulation degree than a previous modulation degree of a channel in which performance on a channel basis that is determined by the performance information becomes higher than the performance range; and
    determining to maintain a previous modulation degree of a channel in which performance on a channel basis that is determined by the performance information exists within the performance range.

10. The method of claim 9, wherein the determining of a modulation degree on the channel basis comprises determining a modulation degree on the channel basis to be a preset initial modulation degree in an initial operation of the visible light communication system.

* * * * *